(12) United States Patent
Octavien

(10) Patent No.: US 10,931,835 B1
(45) Date of Patent: Feb. 23, 2021

(54) PRINT MEDIA SCANNING SYSTEM

(71) Applicant: Steve Octavien, Frisco, TX (US)

(72) Inventor: Steve Octavien, Frisco, TX (US)

( * ) Notice: Subject to any disclaimer, the term of this patent is extended or adjusted under 35 U.S.C. 154(b) by 0 days.

(21) Appl. No.: 16/580,940

(22) Filed: Sep. 24, 2019

Related U.S. Application Data

(60) Provisional application No. 62/735,480, filed on Sep. 24, 2018.

(51) Int. Cl.
*H04N 1/21* (2006.01)
*H04N 1/00* (2006.01)
*H04N 1/024* (2006.01)

(52) U.S. Cl.
CPC ....... *H04N 1/00236* (2013.01); *H04N 1/0249* (2013.01); *H04N 1/2179* (2013.01); *H04N 2201/0434* (2013.01)

(58) Field of Classification Search
CPC ........... H04N 2201/0434; H04N 1/193; H04N 2201/0081; H04N 1/19594; H04N 1/1013; H04N 1/1017; H04N 1/195; H04N 1/1043; H04N 1/1026; H04N 1/1061; H04N 2201/0422; H04N 2201/0436; H04N 1/0464; H04N 1/1048; H04N 1/1052; H04N 1/00381; H04N 1/00408; H04N 1/02815; H04N 1/0282; H04N 1/02845; H04N 1/02885; H04N 1/04; H04N 1/10; H04N 1/103; H04N 1/38; H04N 1/3877; H04N 2201/0096; H04N 2201/0414; H04N 2201/0468; H04N 5/2252; H04N 1/00543; H04N 1/00572; H04N 1/0405; H04N 1/113; H04N 1/192; H04N 1/203; H04N 1/2036; H04N 1/3248; H04N 1/387; H04N 1/3873; H04N 1/3878; H04N 1/401; H04N 2201/0416; H04N 2201/0446; H04N 2201/0458; H04N 2201/0464; H04N 2201/3287; H04N 2201/3288; B42D 9/065; B42D 9/04; G03G 15/04; G03G 15/0435; G03G 15/605; G03G 2215/00282; G06F 3/005; G06F 3/042; G06F 3/0488; G06F 40/58; G09B 21/006; G09B 5/04; G10L 13/00; G03B 27/526; G03B 27/6221; G03B 27/70; G06Q 10/087; G06Q 20/342; G06Q 30/06; G06Q 40/12; G07F 17/0042; G07F 7/025; G07G 1/0054; G08B 13/2408; G08B 13/2417; G08B 13/2471; G08B 13/2474; G08B 13/2482
USPC ....................................................... 358/474
See application file for complete search history.

(56) References Cited

U.S. PATENT DOCUMENTS 5,764,383 A * 6/1998 Saund ................... H04N 1/113 355/25
6,233,064 B1 * 5/2001 Griffin ............... H04N 1/00525 358/474
7,675,641 B2 * 3/2010 Cui ....................... G06K 9/2054 358/1.15

(Continued)

*Primary Examiner* — Negussie Worku
(74) *Attorney, Agent, or Firm* — Richard Eldredge; Leavitt Eldredge Law Firm

(57) ABSTRACT

A print media scanning system enables the rapid acquisition of books, magazines, papers and so on into a digital library. The media is placed on an inclined surface where is held in place and the pages to be scanned are secured by braces. A scanning head is suspended above the media and is adjustable with respect to the media. The data from the scanning head is transferred to a digital library.

6 Claims, 4 Drawing Sheets

(56) References Cited

U.S. PATENT DOCUMENTS

| | | | |
|---|---|---|---|
| 9,760,787 B2* | 9/2017 | Hasegawa | H04N 1/19594 |
| 2003/0063335 A1* | 4/2003 | Mandel | H04N 1/00607 |
| | | | 358/498 |
| 2003/0172795 A1* | 9/2003 | Belkhir | B42D 9/065 |
| | | | 84/486 |
| 2008/0316551 A1* | 12/2008 | Taylor | H04N 1/04 |
| | | | 358/498 |
| 2010/0067068 A1* | 3/2010 | Jeong | H04N 1/195 |
| | | | 358/474 |
| 2010/0296138 A1* | 11/2010 | Jakes | B42D 9/04 |
| | | | 358/494 |
| 2012/0290304 A1* | 11/2012 | Al-Hasan | G06F 40/58 |
| | | | 704/260 |
| 2013/0050482 A1* | 2/2013 | Choi | H04N 5/2252 |
| | | | 348/143 |
| 2013/0077138 A1* | 3/2013 | Shen | H04N 1/19594 |
| | | | 358/498 |
| 2013/0250379 A1* | 9/2013 | Rigazio | H04N 1/19594 |
| | | | 358/538 |
| 2014/0153066 A1* | 6/2014 | Booppanon | G03B 15/07 |
| | | | 358/483 |
| 2015/0375557 A1* | 12/2015 | Hasegawa | H04N 1/00602 |
| | | | 358/498 |
| 2019/0371202 A1* | 12/2019 | Shintani | G02B 27/017 |

* cited by examiner

PRINT MEDIA SCANNING SYSTEM

BACKGROUND

1. Field of the Invention

The present invention relates generally to scanning systems, and more specifically, to a book or bound media scanning system for transferring printed information to a digital format such as a data file or image.

2. Description of Related Art

Scanning systems are well known in the art and are effective means to convert physical objects such as pictures, letters and such to an electronic format. For example, FIG. 1 depicts a conventional flatbed scanning system 101 having bed 103 that houses a scan head 105 beneath a glass panel 107. During use, a book 109 is opened and is placed on the glass panel 107 and the scan head 105 traverses the length of the book 109 and digitizes the content of the open pages. The page is turned and repeated.

One of the problems commonly associated with system 101 is limited efficiency. For example, each page of a book must be scanned to completely transfer the book resulting in several hundred scans and page turns.

Additional, the pressure against the spine when open and forced against the glass damages the book.

Accordingly, although great strides have been made in the area of flatbed scanning systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
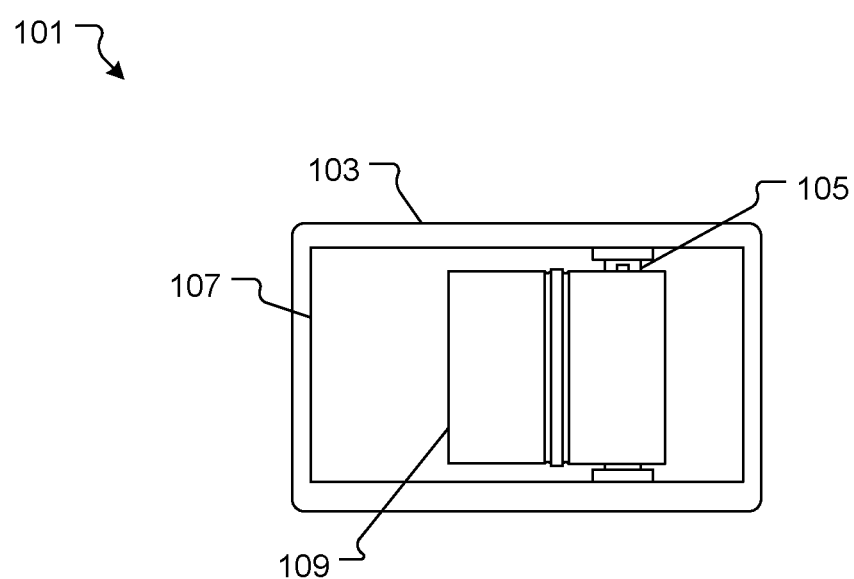
FIG. 1 is a top view of a common flatbed scanning system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional flatbed scanning systems. Specifically, the invention of the present application enables the rapid scanning of books through automated page turning. In addition, the books are not subjected to harmful pressure or force while being scanned. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
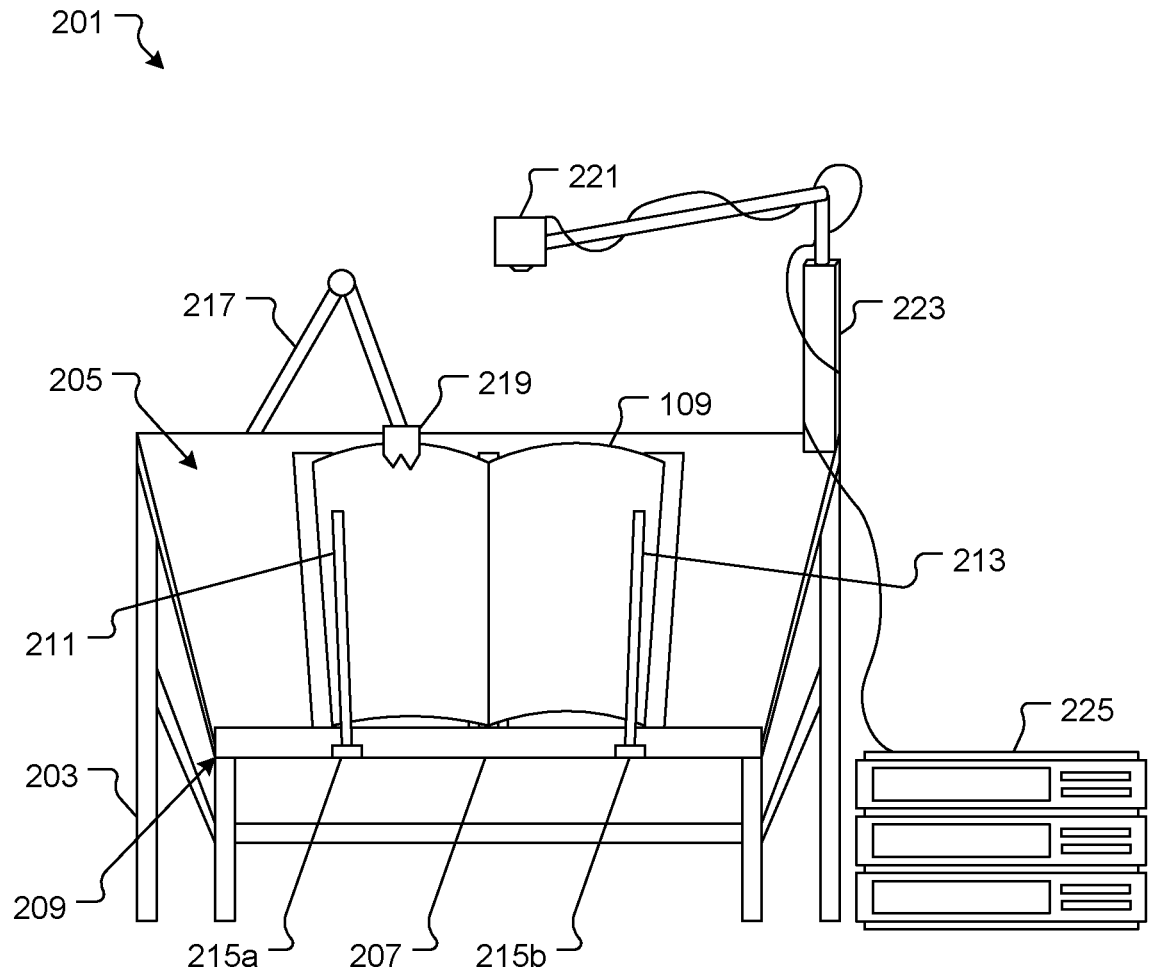
FIG. 2 is a front view of a print media scanning system in accordance with a preferred embodiment of the present application.

Referring now to the drawings wherein like reference characters identify corresponding or similar elements throughout the several views, FIG. 2 depicts a front view of a print media scanning system in accordance with a preferred embodiment of the present application. It will be appreciated that system 201 overcomes one or more of the above-listed problems commonly associated with conventional flatbed scanning systems.

In the contemplated embodiment, system 201 includes a support 203 that has an inclined top surface 205 with a ledge 207 at the bottom end 209. The inclined top surface 205 is configured to allow a book 109 to rest thereon. It is contemplated that the support 203 and the system 201 as a whole could be portable or collapsible to enable the scanning of print media at many locations without the need to relocate the print media.

The system 201 includes a first brace 211 that holds the book 109 near the edge thereof to prevent the pages from turning and a second brace 213 that holds the book 109 near the opposite edge thereof to prevent the pages from turning. The first brace 211 and second brace 213 are attached to the base and activated by motors 215 configures to raise and lower them to allow the pages to be turned.

It is contemplated that the pages are turned by an articulating arm 217 with a self-gripping pad 219 attached at a first end. The articulating arm 217 is attached to the support 203 at the other end thereof.

A scanning head 221 is attached via an adjustable stand 223 to the support 203 so as to be located above the inclined top surface 205. The scanning head 221 is in electronic communication with a PC 225. The PC 225 and the scanning head 221 could be in communication via a network, port, cable or the like. It is contemplated and preferred that the connection is wireless. It will be understood that while the system may be operated by a first user that other users could have the file shared with them or jointly accessed thought the PC 225 and a network.

It should be appreciated that one of the unique features believed characteristic of the present application is that the inclined top surface 203, articulating arm 217 with the scanning head 221 enables the rapid acquisition of printed media such as books.

Figure 3:
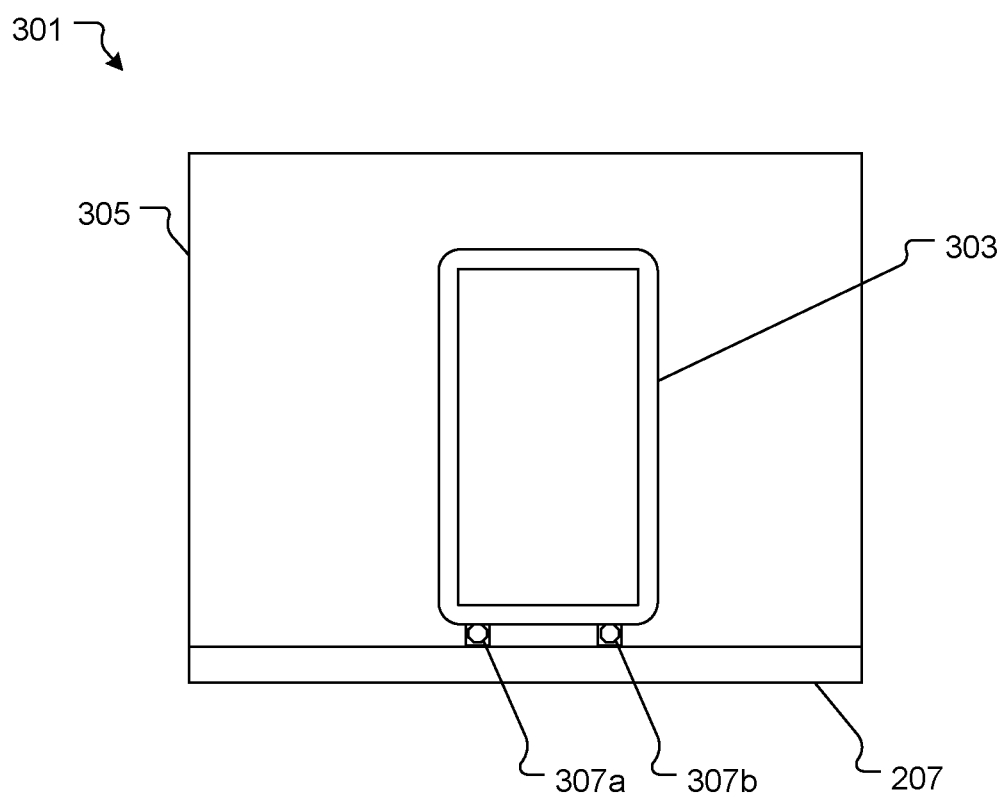
FIG. 3 is a top view of an alternative embodiment of the top surface of FIG. 2.

Referring now to FIG. 3 an alternative embodiment of the inclined top surface 205 is depicted. Embodiment 301 includes a fixture 303 configured to hold single pages to the inclined top surface 305. The fixture 303 attaches to the inclined top surface 305 via joints 307.

Figure 4:
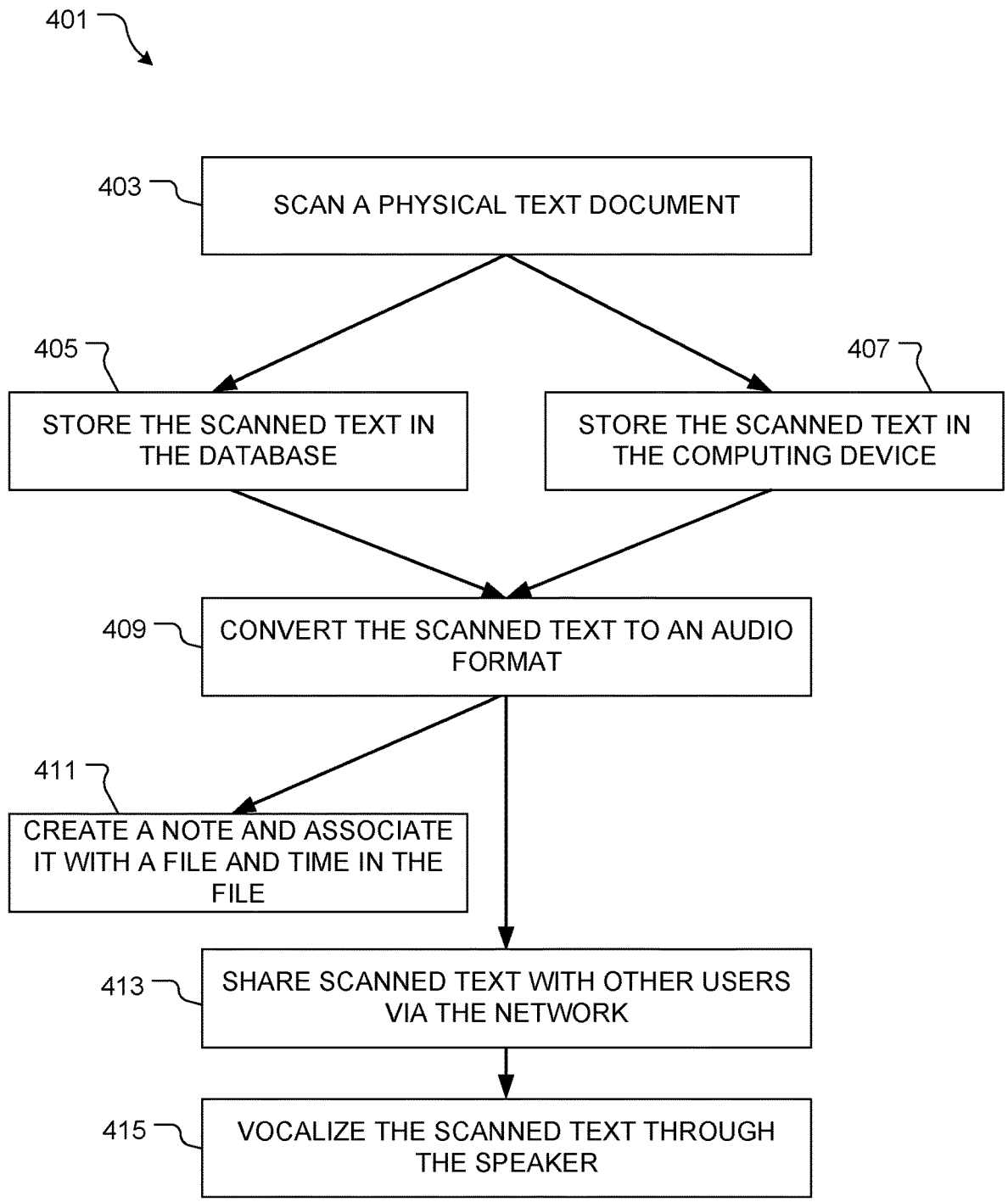
FIG. 4 is a simplified schematic of the data flow of the system of FIG. 2.

Referring now to FIG. 4, it is contemplated and will be appreciated that the PC 225 runs a software system 401 as configured to accept data from the scanning head 221. It will be appreciated that the software system 401 is configured as a library as illustrated in 403-415.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A print media scanning system comprising:
   a support with an inclined top surface;
   a ledge secured to and extending from the top surface;
   a motor configured to sit on the ledge and to move relative thereto;
   at least one brace configured to prevent the pages of a book from turning, the at least one brace is attached to and operated by the motor;
   an articulated arm secured to the top surface and controlled by a computer, the actuated arm is configured to move around the entire top surface of the support; and
   a scanner secured to the articulated arm, the scanner is configured to scan images of the book, the scanner is in data communication with the computer;
   wherein media is placed on the inclined top surface and digitized via the scanning head.

2. The system of claim 1 wherein the data from the scanning head is transferred to a library software system.

3. The system of claim 2 wherein the data from the scanning head is transferred via Bluetooth technology.

4. The system of claim 2 wherein the data from the scanning head is transferred via wireless technology.

5. The system of claim 1 wherein the self-gripping pad is enabled by a vacuum.

6. The method of capturing and using text comprising:
   providing the system of claim 1;
   scanning a physical text document;
   storing the scanned text in a database or a computing device;
   converting the scanned text to an audio format file;
   creating a note associated with the file and a time therein;
   sharing the scanned text with other users via the network; and
   vocalizing the scanned text through a speaker.

* * * * *